(12) United States Patent
Toc et al.

(10) Patent No.: US 11,128,786 B2
(45) Date of Patent: Sep. 21, 2021

(54) BENDING A CIRCUIT-BEARING DIE

(71) Applicant: Apple Inc., Cupertino, CA (US)

(72) Inventors: Howell John Chua Toc, Singapore (SG); Prakash Venkatesappa, Singapore (SG); Annabelle Q. Yang, Singapore (SG); Melvin C. Cabonegro, Singapore (SG)

(73) Assignee: Apple Inc., Cupertino, CA (US)

( * ) Notice: Subject to any disclaimer, the term of this patent is extended or adjusted under 35 U.S.C. 154(b) by 1716 days.

(21) Appl. No.: 14/550,590

(22) Filed: Nov. 21, 2014

(65) Prior Publication Data
US 2016/0150131 A1    May 26, 2016

(51) Int. Cl.
H04N 5/225    (2006.01)
G03B 17/00    (2021.01)
G03B 29/00    (2021.01)
H04M 1/02    (2006.01)

(52) U.S. Cl.
CPC .......... H04N 5/2253 (2013.01); G03B 17/00 (2013.01); G03B 29/00 (2013.01); H04M 1/0264 (2013.01)

(58) Field of Classification Search
CPC . H04N 5/2254; H04N 5/2253; H04M 1/0264; G03B 29/00; G03B 17/00
See application file for complete search history.

(56) References Cited

U.S. PATENT DOCUMENTS

| 6,548,008 | B1 | 4/2003 | Kuriyama et al. | |
|---|---|---|---|---|
| 6,791,072 | B1* | 9/2004 | Prabhu | H01L 27/14601 250/208.1 |
| 6,849,843 | B2 | 2/2005 | Ansorge et al. | |
| 7,626,621 | B2 | 12/2009 | Ito et al. | |
| 7,923,793 | B2 | 4/2011 | Choi et al. | |
| 9,349,763 | B1* | 5/2016 | Lin | H01L 27/14605 |
| 2001/0020671 | A1* | 9/2001 | Ansorge | H01L 27/14603 250/208.1 |
| 2002/0197771 | A1* | 12/2002 | Dotta | H01L 21/563 438/114 |
| 2005/0030408 | A1* | 2/2005 | Ito | H04N 5/2253 348/340 |
| 2012/0147207 | A1* | 6/2012 | Itonaga | H01L 27/14618 348/222.1 |
| 2012/0299140 | A1* | 11/2012 | Sekine | H01L 27/14607 257/432 |
| 2013/0333843 | A1* | 12/2013 | Kim | H04N 5/2253 156/362 |
| 2013/0334706 | A1* | 12/2013 | McConnelee | H01L 23/49822 257/777 |
| 2014/0049683 | A1 | 2/2014 | Guenter et al. | |
| 2016/0086987 | A1* | 3/2016 | McKnight | H01L 27/14607 257/432 |

(Continued)

Primary Examiner — Jason A Flohre
(74) Attorney, Agent, or Firm — Robert C. Kowert; Kowert, Hood, Munyon, Rankin & Goetzel, P.C.

(57) ABSTRACT

An image sensor device includes a substrate, a die, and an adhesive layer positioned between the substrate and the die. The substrate includes a first side having a curved surface. The die includes an image sensor component attached to the curved surface of the substrate. At least a portion of the die comprising the image sensor component has a curved surface. The adhesive layer positioned between the curved surface of the substrate and the die provides a fixed attachment between the die and the substrate.

19 Claims, 12 Drawing Sheets

(56) References Cited

U.S. PATENT DOCUMENTS

| | | | |
|---|---|---|---|
| 2016/0086994 A1* | 3/2016 | Guenter | H01L 27/14625 250/206 |
| 2016/0099285 A1* | 4/2016 | Kumagai | H01L 27/14607 29/25.01 |
| 2016/0254246 A1* | 9/2016 | Li | H01L 24/75 438/107 |
| 2017/0005125 A1* | 1/2017 | Itonaga | H01L 27/14601 |

* cited by examiner

BENDING A CIRCUIT-BEARING DIE

BACKGROUND

Technical Field

This disclosure relates generally to camera components.

Description of the Related Art

For high-end (and particularly for mobile) computing devices, it is common to incorporate miniature cameras. Such high-end mobile computing devices are referred to as multifunction devices.

Demands on improvements to performance of such miniature cameras are constant, as are demands for continued miniaturization, given the added features and devices added to such mobile devices.

In particular, demands to decrease the dimensions of camera components and demands for high image quality continue to create an ongoing desire for camera components that exhibit superior performance as measured in various ways, while consuming less space and energy.

SUMMARY OF EMBODIMENTS

Some embodiments provide an image sensor device that includes a substrate, a die, and an adhesive layer positioned between the substrate and the die. The substrate includes a first side having a curved surface. The die includes an image sensor component attached to the curved surface of the substrate. At least a portion of the die comprising the image sensor component has a curved surface. The adhesive layer positioned between the curved surface of the substrate and the die provides a fixed attachment between the die and the substrate.

Figure 1:
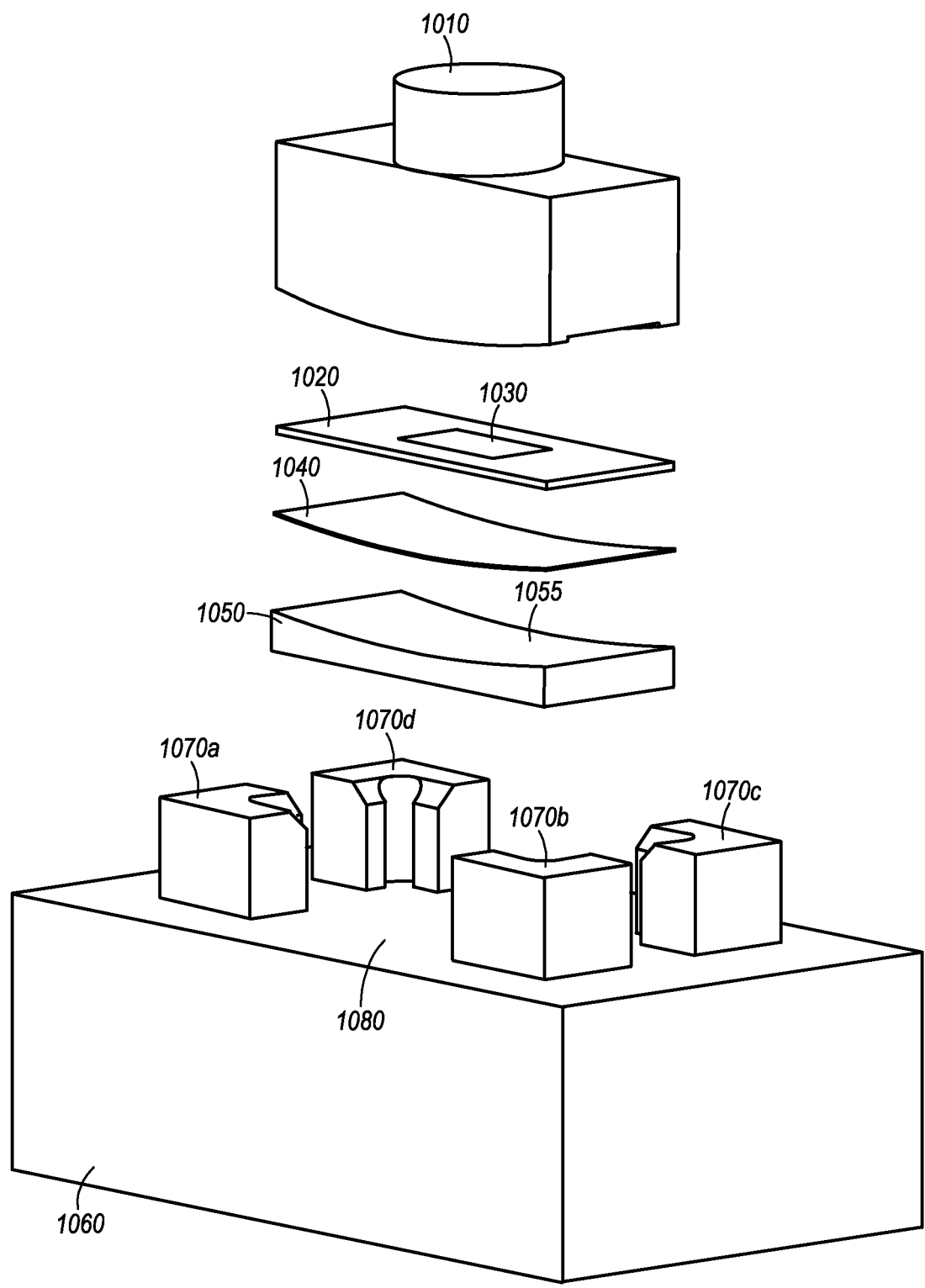
FIG. 1 depicts a set of parts and tools for a process for bending a circuit-bearing die, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Introduction

In some embodiments, a multifunction device includes a camera. In some embodiments, the camera includes one or more lenses for directing light to an image sensor component of the camera. In some embodiments, the camera includes an image sensor device. In some embodiments, the image sensor device includes a substrate. In some embodiments, the substrate includes a first side having a curved surface. In some embodiments, the image sensor device includes a die. In some embodiments, the die includes the image sensor component, and the die is attached to the curved surface of the substrate. In some embodiments, at least a portion of the die including the image sensor component has a curved surface. In some embodiments, the die is a circuit-bearing die of gallium arsenide or silicon, though one of skill in the art will readily comprehend in light of having read the present disclosure that other circuit bearing materials may be substituted for silicon without deviating from the scope and intent of the present disclosure.

In some embodiments, the at least a portion of the die including the image sensor component having a curved surface further includes at least a portion of the die including the image sensor component having a curved surface conforming to a focal radius of one of the one or more lenses for directing light to the image sensor component.

Some embodiments further include a heat-cured adhesive layer positioned between the curved surface of the substrate and the die. In some embodiments, the heat-cured adhesive layer provides a fixed attachment between the die and the substrate.

In some embodiments, the substrate further includes a second side having a flat surface for attachment of the substrate to an articulating component for articulating the lens to the image sensor.

In some embodiments, the first side having a curved surface further includes at least a portion of the substrate having a curved surface conforming to a focal radius of one of the one or more lenses for directing light to the image sensor component.

Some embodiments include an image sensor device. In some embodiments, the image sensor device includes a substrate. In some embodiments, the substrate includes a first side having a curved surface, a die including an image sensor component attached to the curved surface of the substrate, and an adhesive layer positioned between the curved surface of the substrate and the die. In some embodiments, at least a portion of the die including the image sensor component has a curved surface, and the adhesive layer provides a fixed attachment between the die and the substrate.

In some embodiments, the at least a portion of the die including the image sensor component having a curved surface further includes at least a portion of the die including the image sensor component having a curved surface conforming to a focal radius of a lens for depositing light on the image sensor component in a camera including the image sensor device.

In some embodiments, the adhesive layer positioned between the curved surface of the substrate and the die further includes a heat-cured adhesive layer for providing a fixed alignment between the die and the lens. In some embodiments, the adhesive layer positioned between the curved surface of the substrate and the die further includes a pressure-sensitive adhesive layer for providing a fixed alignment between the die and the lens.

In some embodiments, the adhesive layer positioned between the curved surface of the substrate and the die further includes a light-cured adhesive layer for providing a fixed alignment between the die and the lens.

In some embodiments, the first side having a curved surface further includes at least a portion of the substrate having a curved surface conforming to a focal radius of a lens for depositing light on the image sensor component in a camera including the image sensor device.

Some embodiments include a method for manufacturing an image sensor device. In some embodiments, the method includes depositing an adhesive layer onto a substrate in a stage tool. In some embodiments, the depositing is performed after the die is separated from other dice of the wafer. In some embodiments, the substrate includes a curved surface positioned in the stage tool to receive the adhesive layer. In some embodiments, the method includes depositing a die onto the adhesive layer. In some embodiments, the die contains an image sensor. In some embodiments, the method includes applying pressure to the die using a bond tool. In some embodiments, the applying pressure to the die further includes applying a pressure calculated to create a curvature of the die corresponding to a curvature of the curved surface of the substrate. In some embodiments, the method includes curing the adhesive. In some embodiments, the curing the adhesive further includes delivering energy to the adhesive using the bond tool.

In some embodiments, the depositing the adhesive layer onto a substrate in the stage tool further includes depositing the adhesive onto a surface area smaller than a surface area of the curved surface of the substrate.

In some embodiments, the applying pressure to the die further includes applying the pressure using a bond tool having a cavity on a surface of the bond tool for prevention of contact with critical areas of the die. Some embodiments further include positioning a substrate in a stage tool.

In some embodiments, the positioning a substrate in the stage tool further includes positioning the substrate with a flat side of a substrate facing a complementary surface of the stage tool and a curved surface of the substrate facing an opening of the stage tool designed for receiving the die and bond tool.

In some embodiments, the delivering energy to the adhesive using the bond tool is performed subsequent to initiation of the applying pressure calculated to create the curvature of the die corresponding to the curvature of the curved surface of the substrate.

In some embodiments, the delivering energy to the adhesive using the bond tool is performed prior to the applying pressure calculated to create the curvature of the die corresponding to the curvature of the curved surface of the substrate. In some embodiments, the delivering energy to the adhesive using the bond tool further includes delivering kinetic energy to a pressure-sensitive adhesive using a strike of the bond tool.

In some embodiments, the delivering energy to the adhesive using the bond tool further includes delivering thermal energy to the adhesive using a thermal resistor located within the bond tool.

In some embodiments, the delivering energy to the adhesive using the bond tool further includes delivering light energy to the adhesive using a light source.

Some embodiments include a non-transitory computer-readable storage medium including program instructions. In some embodiments, the program instructions are executable by one or more processors to cause a manufacturing system to implement depositing an adhesive layer onto a substrate in a stage tool. In some embodiments, the substrate includes a curved surface positioned in the stage tool to receive the adhesive layer.

In some embodiments, the program instructions are executable by one or more processors to cause a manufacturing system to implement depositing a die onto the adhesive layer. In some embodiments, the die contains an image sensor.

In some embodiments, the program instructions are executable by one or more processors to cause a manufacturing system to implement applying pressure to the die using a bond tool. In some embodiments, the applying pressure to the die further includes applying a pressure calculated to create a curvature of the die corresponding to a curvature of the curved surface of the substrate.

In some embodiments, the program instructions are executable by one or more processors to cause a manufacturing system to implement curing the adhesive. In some embodiments, the curing the adhesive further includes delivering energy to the adhesive using the bond tool.

In some embodiments, the program instructions executable by one or more processors to cause a manufacturing system to implement depositing the adhesive layer onto a substrate in the stage tool further include program instructions executable by one or more processors to cause a manufacturing system to implement depositing the adhesive onto a surface area smaller than a surface area of the curved surface of the substrate.

In some embodiments, the program instructions executable by one or more processors to cause a manufacturing system to implement applying pressure to the die further include program instructions executable by one or more processors to cause a manufacturing system to implement applying the pressure using a bond tool having a cavity on a surface of the bond tool for prevention of contact with critical areas of the die.

In some embodiments, the program instructions executable by one or more processors further include program instructions executable by one or more processors to cause a manufacturing system to implement positioning a substrate in a stage tool. In some embodiments, the program instructions executable by one or more processors to cause a manufacturing system to implement positioning a substrate in the stage tool further include program instructions executable by one or more processors to cause a manufacturing system to implement positioning the substrate with a flat side of a substrate facing a complementary surface of the stage tool and a curved surface of the substrate facing an opening of the stage tool designed for receiving the die and bond tool.

In some embodiments, the delivering energy to the adhesive using the bond tool is performed subsequent to initiation of the applying pressure calculated to create the curvature of the die corresponding to the curvature of the curved surface of the substrate. In some embodiments, the delivering energy to the adhesive using the bond tool is performed prior to the applying pressure calculated to create the curvature of the die corresponding to the curvature of the curved surface of the substrate.

In some embodiments, the delivering energy to the adhesive using the bond tool further includes delivering kinetic energy to a pressure-sensitive adhesive using a strike of the bond tool. In some embodiments, the delivering energy to the adhesive using the bond tool further includes delivering thermal energy to the adhesive using a thermal resistor located within the bond tool. In some embodiments, the delivering energy to the adhesive using the bond tool further includes delivering light energy to the adhesive using a light source.

Some embodiments include a bond tool. In some embodiments, the bond tool includes a pressure surface for applying pressure to a die, a cavity on a surface of the bond tool for prevention of contact with critical areas of the die, and an energy conduction mass for delivering energy to the die. Some embodiments include a stage tool. In some embodiments, the stage tool includes a flat horizontal surface of the stage tool for receiving a flat surface of a substrate and one or more vertical members for maintaining a horizontal position of the substrate during bending of the circuit-bearing die.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad). In some embodiments, the device is a gaming computer with orientation sensors (e.g., orientation sensors in a gaming controller). In other embodiments, the device is not a portable communications device, but is a camera.

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Example Embodiment Components

FIG. 1 depicts a set of parts and tools for a process for bending a circuit-bearing die, according to some embodiments. FIG. 1 is an exploded view of the assembly process. FIG. 1 shows a bond tool 1010, a die 1020 with an image sensor 1030, an adhesive layer 1040, a substrate 1050, and a stage tool 1060 with vertical members 1070a-1070d and a horizontal flat surface 1080.

Some embodiments include a method for manufacturing an image sensor device. In some embodiments, the method includes depositing the adhesive layer 1040 onto the substrate 1050 seated in the stage tool 1060. In some embodiments, the substrate includes a curved surface 1055 and is positioned in the stage tool 1060 to receive the adhesive layer 1040. In some embodiments, the method includes depositing a die 1020 onto the adhesive layer 1040. In some embodiments, the die 1020 contains an image sensor 1030. In some embodiments, the method includes applying pressure to the die 1020 using the bond tool 1010. In some embodiments, the applying pressure to the die 1020 further includes applying a pressure calculated to create a curvature of the die 1020 corresponding to a curvature of the curved surface 1055 of the substrate 1050. In some embodiments, the method includes curing the adhesive 1040. In some embodiments, the curing the adhesive 1040 further includes delivering energy to the adhesive 1040 using the bond tool 1010.

While the adhesive layer 1040 of FIG. 1 is shown as being equal in area to the area of the curved surface 1055 of the substrate 1050, one of skill in the art will readily comprehend in light of having read the present specification that, in some embodiments, the depositing the adhesive layer 1040 onto a substrate 1050 in the stage tool 1060 further includes depositing the adhesive 1040 onto a surface area smaller than a surface area of the curved surface 1055 of the substrate 1050.

In some embodiments, the positioning a substrate 1050 in the stage tool 1060 further includes positioning the substrate 1050 with a flat side (2 of 5 visible) of a substrate 1050 facing a complementary surface 1080 of the stage tool 1060 and a curved surface 1055 of the substrate 1050 facing an opening (e.g., above flat surface 1080) of the stage tool 1060 designed for receiving the die 1020 and bond tool 1010.

In some embodiments, the delivering energy to the adhesive 1040 using the bond tool 1010 is performed subsequent to initiation of the applying pressure calculated to create the curvature of the die 1020 corresponding to the curvature of the curved surface 1055 of the substrate 1050.

In some embodiments, the delivering energy to the adhesive 1040 using the bond tool 1010 is performed prior to the applying pressure calculated to create the curvature of the die 1020 corresponding to the curvature of the curved surface 1055 of the substrate 1050. In some embodiments, the delivering energy to the adhesive 1040 using the bond tool 1010 further includes delivering kinetic energy to a pressure-sensitive adhesive 1040 using a strike of the bond tool 1010 against the die 1020.

In some embodiments, the delivering energy to the adhesive 1040 using the bond tool 1010 further includes delivering thermal energy to the adhesive 1040 using a thermal resistor (not shown) located within the bond tool 1010. Alternatively, the bond tool 1010 can receive heat from a heating element external to the bond tool 1010.

In some embodiments, the delivering energy to the adhesive 1040 using the bond tool 1010 further includes delivering light energy to the adhesive 1040 using a light source (not shown) located within or mounted on bond tool 1010.

Figure 6:
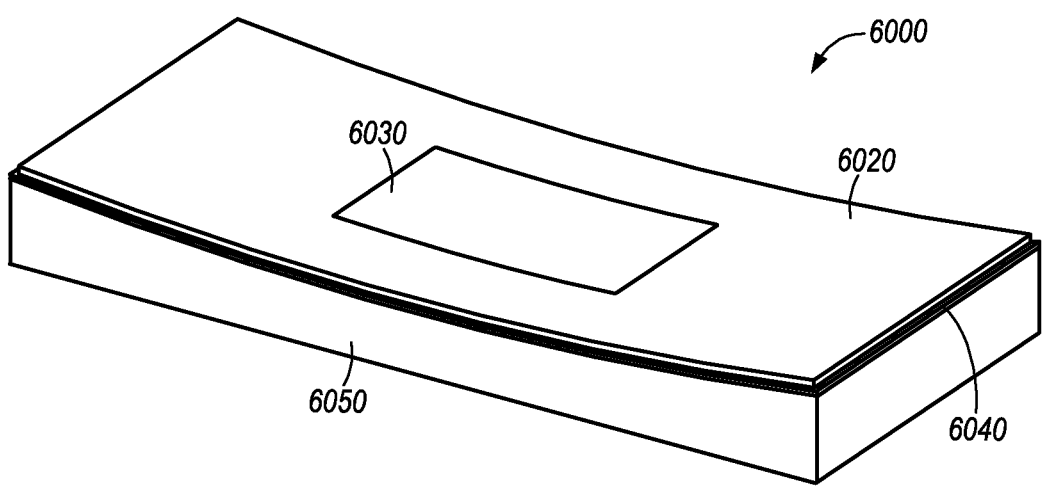
FIG. 6 illustrates a bent circuit-bearing die resulting from a process for bending a circuit-bearing die, according to some embodiments.

In some embodiments, a multifunction device includes a camera. A multifunction device having such a camera is described below with respect to FIGS. 10-11. In some embodiments, the camera includes one or more lenses (e.g., as illustrated with respect to FIG. 9 and discussed below) for directing light to an image sensor component (e.g., as illustrated in FIG. 6 and described below) of the camera. In some embodiments, the camera (e.g., camera 164 of FIG. 10-11) includes an image sensor device (e.g. image sensor device 6000 of FIG. 6). Turning briefly to FIG. 6, in some embodiments, the image sensor device 6000 includes a substrate 6050. In some embodiments, the substrate includes a first side having a curved surface (e.g., curved surface 1055 shown in FIG. 1). In some embodiments, the image sensor device 6000 includes a die 6020. In some embodiments, the die 6020 includes the image sensor component 6030, and the die 6020 is attached to the curved surface (e.g., curved surface 1055 shown in FIG. 1) of the substrate 6050.

In some embodiments, at least a portion of the die 6020 including the image sensor component 6030 has a curved surface. In some embodiments, the at least a portion of the die 6020 including the image sensor component 6030 having a curved surface further includes at least a portion of the die 6020 including the image sensor component 6030 having a curved surface conforming to a focal radius of one of the one or more lenses for directing light to the image sensor component 6030 (e.g., as illustrated with respect to FIG. 9 and discussed below).

Some embodiments further include a heat-cured adhesive layer 6040 positioned between the curved surface of the substrate 6050 and the die 6020. In some embodiments, the heat-cured adhesive layer 6040 provides a fixed attachment between the die 6030 and the substrate 6050.

Figure 2:
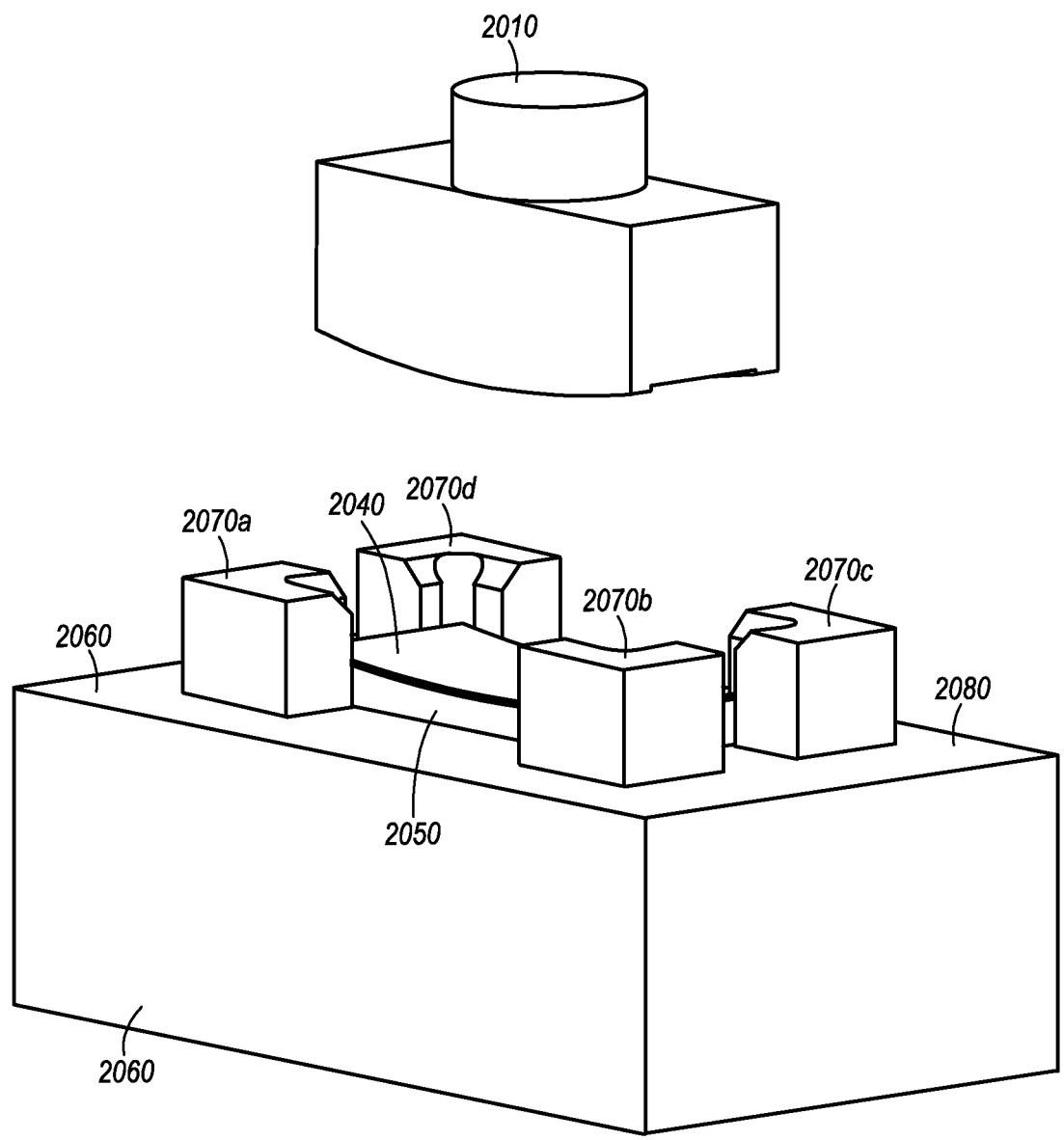
FIG. 2 illustrates a set of parts and tools after placement of an adhesive layer on a substrate in a process for bending a circuit-bearing die, according to some embodiments.

FIG. 2 illustrates a set of parts and tools after placement of an adhesive layer on a substrate in a process for bending a circuit-bearing die, according to some embodiments. FIG. 2 shows a bond tool 2010, an adhesive layer 2040, a substrate 2050, and a stage tool 2060 with vertical members 2070a-2070d and a horizontal flat surface (not visible in FIG. 2).

Some embodiments include a method for manufacturing an image sensor device. In some embodiments, the method includes depositing the adhesive layer 2040 onto the substrate 2050 seated in the stage tool 2060. In some embodiments, the substrate includes a curved surface (not visible in FIG. 2) and is positioned in the stage tool 2060 to receive the adhesive layer 2040. In some embodiments, the method includes depositing a die (not shown in FIG. 2) onto the adhesive layer 2040. In some embodiments, the die (not shown in FIG. 2) contains an image sensor (not shown in FIG. 2). In some embodiments, the method includes applying pressure to the die (not shown in FIG. 2) using the bond tool 2010. In some embodiments, the applying pressure to the die (not shown in FIG. 2) further includes applying a pressure calculated to create a curvature of the die (not shown in FIG. 2) corresponding to a curvature of the curved surface (not shown in FIG. 2) of the substrate 2050. In some embodiments, the method includes curing the adhesive 2040. In some embodiments, the curing the adhesive 2040 further includes delivering energy to the adhesive 2040 using the bond tool 2010.

While the adhesive layer 2040 of FIG. 2 is shown as being equal in area to the area of the curved surface (not shown in FIG. 2) of the substrate 2050, one of skill in the art will readily comprehend in light of having read the present specification that, in some embodiments, the depositing the adhesive layer 2040 onto a substrate 2050 in the stage tool 2060 further includes depositing the adhesive 2040 onto a surface area smaller than a surface area of the curved surface (not shown in FIG. 2) of the substrate 2050.

In some embodiments, the positioning a substrate 2050 in the stage tool 2060 further includes positioning the substrate 2050 with a flat side (2 of 5 visible) of a substrate 2050 facing a complementary surface 2080 of the stage tool 2060 and a curved surface (not visible in FIG. 2) of the substrate 2050 facing an opening (not visible in FIG. 2) of the stage tool 2060 designed for receiving the die (not visible in FIG. 2) and bond tool 2010.

In some embodiments, the delivering energy to the adhesive 2040 using the bond tool 2010 is performed subsequent to initiation of the applying pressure calculated to create the curvature of the die (not shown in FIG. 2) corresponding to the curvature of the curved surface (not visible in FIG. 2) of the substrate 2050.

In some embodiments, the delivering energy to the adhesive 2040 using the bond tool 2010 is performed prior to the applying pressure calculated to create the curvature of the die (not shown in FIG. 2) corresponding to the curvature of the curved surface (not visible in FIG. 2) of the substrate 2050. In some embodiments, the delivering energy to the adhesive 2040 using the bond tool 2010 further includes delivering kinetic energy to a pressure-sensitive adhesive 2040 using a strike of the bond tool 2010 against the die (not shown in FIG. 2).

In some embodiments, the delivering energy to the adhesive 2040 using the bond tool 2010 further includes delivering thermal energy to the adhesive 2040 using a thermal resistor (not shown in FIG. 2) located within the bond tool 2010. Alternatively, the bond tool 2010 can receive heat from a heating element (not shown in FIG. 2) external to the bond tool 2010.

Figure 3:
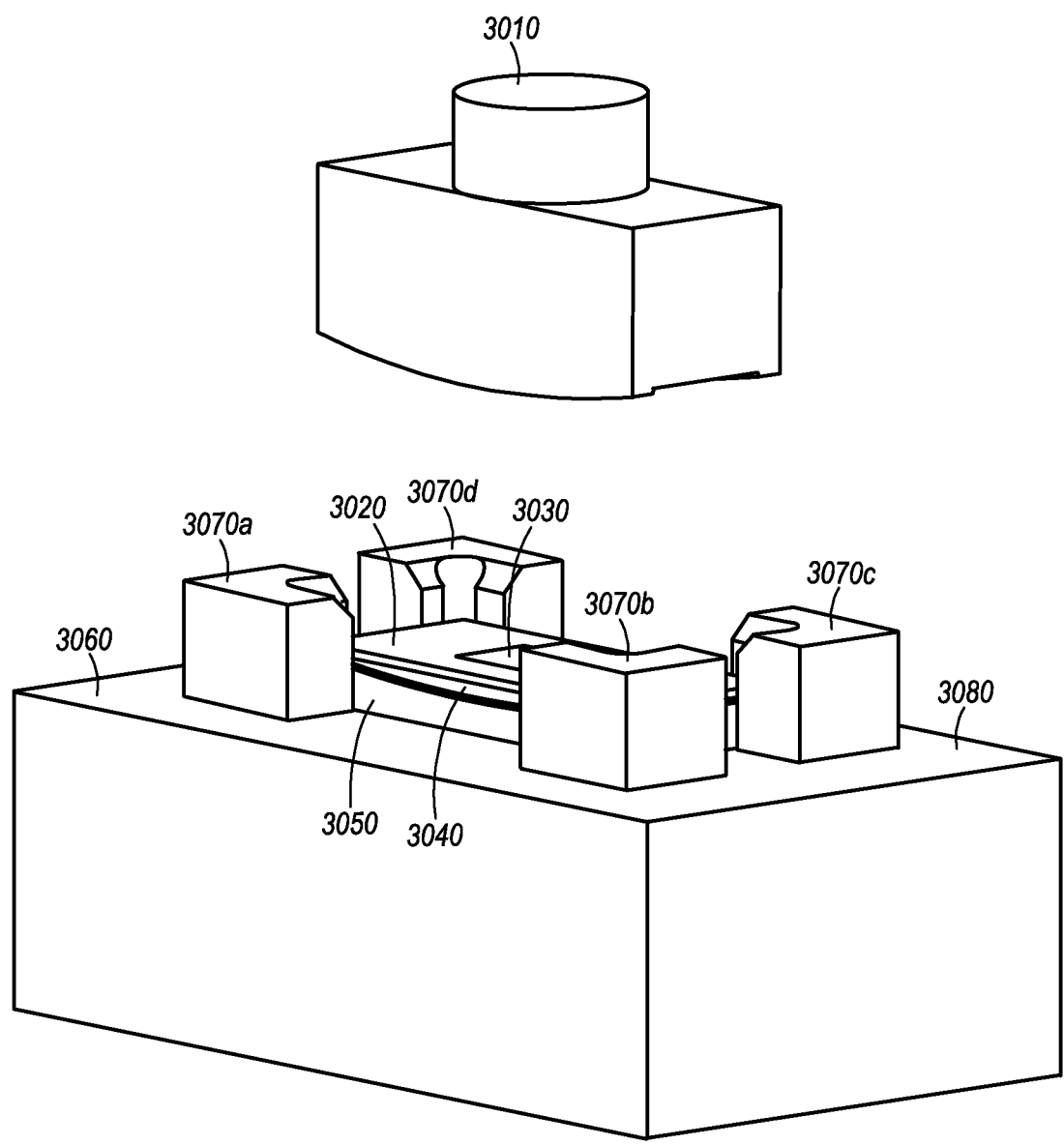
FIG. 3 depicts a set of parts and tools after placement of a die on an adhesive layer in a process for bending a circuit-bearing die, according to some embodiments.

FIG. 3 depicts a set of parts and tools after placement of a die on an adhesive layer in a process for bending a circuit-bearing die, according to some embodiments. FIG. 3 shows a bond tool 3010, a die 3020 with an image sensor 3030, an adhesive layer 3040, a substrate 3050, and a stage tool 3060 with vertical members 3070a-3070d and a horizontal flat surface 3080.

Some embodiments include a method for manufacturing an image sensor device. In some embodiments, the method includes depositing the adhesive layer 3040 onto the substrate 3050 seated in the stage tool 3060. In some embodiments, the substrate includes a curved surface (not visible in FIG. 3) and is positioned in the stage tool 3060 to receive the adhesive layer 3040. In some embodiments, the method includes depositing a die 3020 onto the adhesive layer 3040. In some embodiments, the die 3020 contains an image sensor 3030. In some embodiments, the method includes applying pressure to the die 3020 using the bond tool 3010. In some embodiments, the applying pressure to the die 3020 further includes applying a pressure calculated to create a curvature of the die 3020 corresponding to a curvature of the curved surface (not visible in FIG. 3) of the substrate 3050. In some embodiments, the method includes curing the adhesive 3040. In some embodiments, the curing the adhesive 3040 further includes delivering energy to the adhesive 3040 using the bond tool 3010.

While the adhesive layer 3040 of FIG. 3 is shown as being equal in area to the area of the curved surface (not visible in FIG. 2) of the substrate 3050, one of skill in the art will readily comprehend in light of having read the present specification that, in some embodiments, the depositing the adhesive layer 3040 onto a substrate 3050 in the stage tool 3060 further includes depositing the adhesive 3040 onto a surface area smaller than a surface area of the curved surface (not visible in FIG. 3) of the substrate 3050.

In some embodiments, the positioning a substrate 3050 in the stage tool 3060 further includes positioning the substrate 3050 with a flat side (2 of 5 visible) of a substrate 3050 facing a complementary surface 3080 of the stage tool 3060 and a curved surface (not visible in FIG. 23) of the substrate 3050 facing an opening (e.g., above flat surface) of the stage tool 3060 designed for receiving the die 3020 and bond tool 3010.

In some embodiments, the delivering energy to the adhesive 3040 using the bond tool 3010 is performed subsequent to initiation of the applying pressure calculated to create the curvature of the die 3020 corresponding to the curvature of the curved surface (not visible in FIG. 2) of the substrate 3050.

In some embodiments, the delivering energy to the adhesive 3040 using the bond tool 3010 is performed prior to the applying pressure calculated to create the curvature of the die 3020 corresponding to the curvature of the curved surface (not visible in FIG. 3) of the substrate 3050. In some embodiments, the delivering energy to the adhesive 3040 using the bond tool 3010 further includes delivering kinetic energy to a pressure-sensitive adhesive 3040 using a strike of the bond tool 3010 against the die 3020.

In some embodiments, the delivering energy to the adhesive 3040 using the bond tool 3010 further includes delivering thermal energy to the adhesive 3040 using a thermal resistor (not shown) located within the bond tool 3010.

Alternatively, the bond tool 3010 can receive heat from a heating element (not shown in FIG. 3) external to the bond tool 3030.

Figure 4:
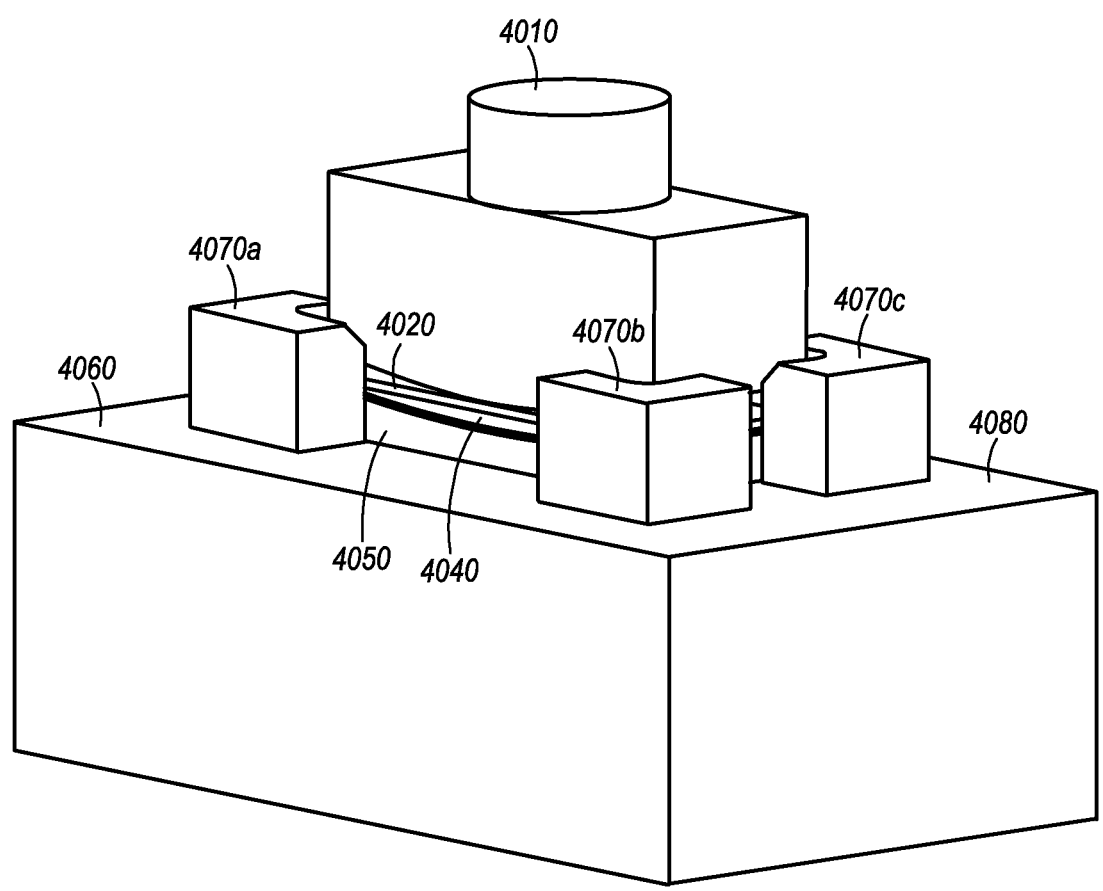
FIG. 4 illustrates a set of parts and tools during application of a bond tool in a process for bending a circuit-bearing die, according to some embodiments.

FIG. 4 illustrates a set of parts and tools during application of a bond tool in a process for bending a circuit-bearing die, according to some embodiments. FIG. 4 shows a bond tool 4010, a die 4020, an adhesive layer 4040, a substrate 4050, and a stage tool 4060 with vertical members 4070a-4070c and a horizontal flat surface 4080.

Some embodiments include a method for manufacturing an image sensor device. In some embodiments, the method includes depositing the adhesive layer 4040 onto the substrate 4050 seated in the stage tool 4060. In some embodiments, the substrate includes a curved surface (not visible in FIG. 4) and is positioned in the stage tool 4070 to receive the adhesive layer 4040. In some embodiments, the method includes depositing a die 4020 onto the adhesive layer 4040. In some embodiments, the die 4020 contains an image sensor (not visible in FIG. 4). In some embodiments, the method includes applying pressure to the die 4020 using the bond tool 4010. In some embodiments, the applying pressure to the die 4020 further includes applying a pressure calculated to create a curvature of the die 4020 corresponding to a curvature of the curved surface (not visible in FIG. 4) of the substrate 4050. In some embodiments, the method includes curing the adhesive 4040. In some embodiments, the curing the adhesive 4040 further includes delivering energy to the adhesive 4040 using the bond tool 4010.

While the adhesive layer 4040 of FIG. 4 is shown as being equal in area to the area of the curved surface (not visible in FIG. 4) of the substrate 4050, one of skill in the art will readily comprehend in light of having read the present specification that, in some embodiments, the depositing the adhesive layer 4040 onto a substrate 4050 in the stage tool 4060 further includes depositing the adhesive 4040 onto a surface area smaller than a surface area of the curved surface (not visible in FIG. 4) of the substrate 4050.

In some embodiments, the positioning a substrate 4050 in the stage tool 4060 further includes positioning the substrate 4050 with a flat side (2 of 5 visible) of a substrate 4050 facing a complementary surface 4080 of the stage tool 4060 and a curved surface (not visible in FIG. 4) of the substrate 4050 facing an opening (e.g., above flat surface 4080) of the stage tool 4060 designed for receiving the die 4020 and bond tool 4040.

In some embodiments, the delivering energy to the adhesive 4040 using the bond tool 4010 is performed subsequent to initiation of the applying pressure calculated to create the curvature of the die 4020 corresponding to the curvature of the curved surface (not visible in FIG. 4) of the substrate 4050.

In some embodiments, the delivering energy to the adhesive 4040 using the bond tool 4010 is performed prior to the applying pressure calculated to create the curvature of the die 4020 corresponding to the curvature of the curved surface (not visible in FIG. 4) of the substrate 4050. In some embodiments, the delivering energy to the adhesive 4040 using the bond tool 4040 further includes delivering kinetic energy to a pressure-sensitive adhesive 4040 using a strike of the bond tool 4010 against the die 4020.

In some embodiments, the delivering energy to the adhesive 4040 using the bond tool 4010 further includes delivering thermal energy to the adhesive 4040 using a thermal resistor (not shown) located within the bond tool 4010. Alternatively, the bond tool 4010 can receive heat from a heating element external to the bond tool 4010.

Figure 5:
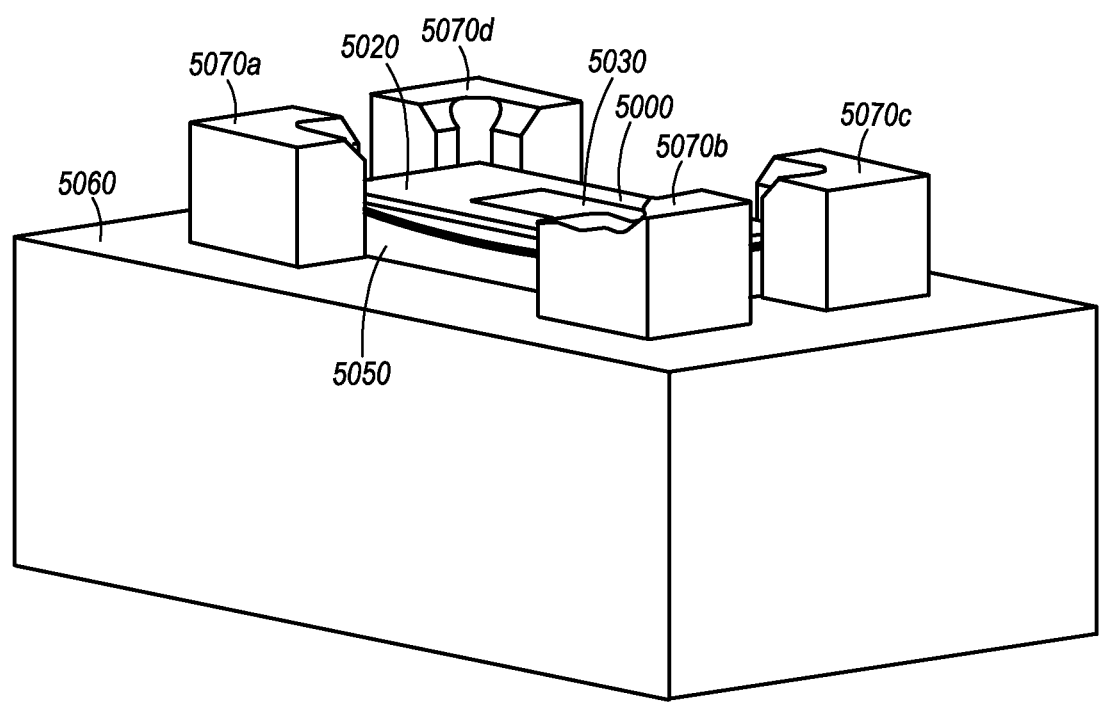
FIG. 5 depicts a curved circuit-bearing die and tools after application of a bond tool in a process for bending a circuit-bearing die, according to some embodiments.

FIG. 5 depicts a curved circuit-bearing die and tools after application of a bond tool in a process for bending a circuit-bearing die, according to some embodiments. In FIG. 5, an image sensor device 5000 sits on a stage tool 5060 resulting from conclusion of a process for bending a circuit-bearing die 5020. In some embodiments, the image sensor device 5000 includes a substrate 5050. In some embodiments, the substrate 5050 includes a first side having a curved surface (e.g., curved surface 1055 shown in FIG. 1). In some embodiments, the image sensor device 5000 includes a die 5020. In some embodiments, the die 5020 includes the image sensor component 5030, and the die 5020 is attached to the curved surface (e.g., curved surface 1055 shown in FIG. 1) of the substrate 5050.

In some embodiments, at least a portion of the die 5020 including the image sensor component 5030 has a curved surface. In some embodiments, the at least a portion of the die 5020 including the image sensor component 5030 having a curved surface further includes at least a portion of the die 5020 including the image sensor component 5030 having a curved surface conforming to a focal radius of one of the one or more lenses for directing light to the image sensor component.

Turning briefly to FIG. 6, in some embodiments, the image sensor device 6000 includes a substrate 6050. In some embodiments, the substrate includes a first side having a curved surface (e.g., curved surface 1055 shown in FIG. 1). In some embodiments, the image sensor device 6000 includes a die 6020. In some embodiments, the die 6020 includes the image sensor component 6030, and the die 6020 is attached to the curved surface (e.g., curved surface 1055 shown in FIG. 1) of the substrate 6050.

In some embodiments, at least a portion of the die 6020 including the image sensor component 6030 has a curved surface. In some embodiments, the at least a portion of the die 6020 including the image sensor component 6030 having a curved surface further includes at least a portion of the die 6020 including the image sensor component 6030 having a curved surface conforming to a focal radius of one of the one or more lenses for directing light to the image sensor component.

Some embodiments further include a heat-cured adhesive layer 6040 positioned between the curved surface (not visible in FIG. 6) of the substrate 6050 and the die 6020. In some embodiments, the heat-cured adhesive layer 6040 provides a fixed attachment between the die 6020 and the substrate 6050.

In some embodiments, the substrate 6050 further includes a second side having a flat surface (2 of 5 shown) for attachment of the substrate 6050 to an articulating component for articulating a lens or lens assembly to the image sensor 6030.

In some embodiments, the first side having a curved surface (not visible in FIG. 6) further includes at least a portion of the substrate 6050 having a curved surface (not visible in FIG. 6) conforming to a focal radius of one of the one or more lenses for directing light to the image sensor component (as discussed below with respect to FIG. 9).

Figure 7:
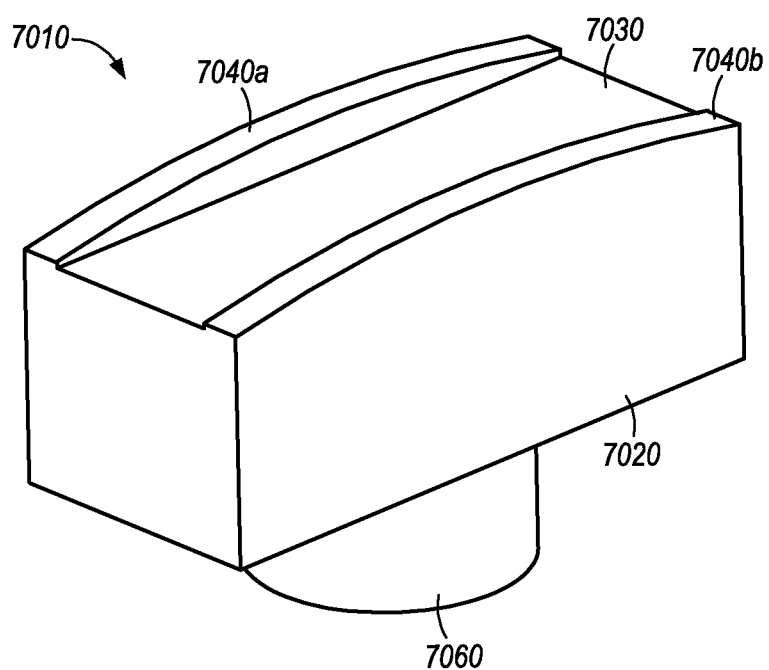
FIG. 7 depicts a bond tool for use in a process for bending a circuit-bearing die, according to some embodiments.

FIG. 7 depicts a bond tool for use in a process for bending a circuit-bearing die, according to some embodiments. Bond tool 7010 includes a body 7020 in which energy delivery elements (not visible) may be located and a stem 7060 for attachment to a machine for use in process for bending a circuit-bearing die. A pressure surface, 7030 is enclosed by ridges 7040a-b.

Some embodiments include a bond tool 7010. In some embodiments, the bond tool 7010 includes a pressure surface 7030 for applying pressure to a die, a cavity on a surface of the bond tool (above pressure surface 7030 and between ridges 7040a-7040b) for prevention of contact with critical areas of the die, and an energy conduction mass in body 7020 for delivering energy to the die. In some embodiments, the applying pressure to the die (e.g., die 1020 of FIG. 1) further includes applying the pressure using a bond tool 7010 having a cavity (above pressure surface 7030 and between ridges 7040a-7040b) on a surface of the bond tool 7010 for prevention of contact with critical areas of the die. Some embodiments further include positioning a substrate in a stage tool.

Figure 8:
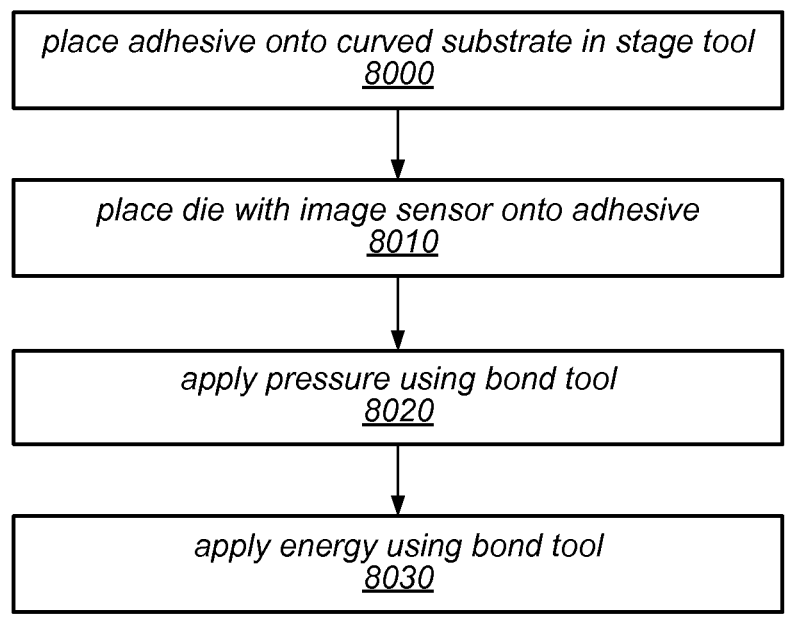
FIG. 8 is a high-level logical flowchart of a process for bending a circuit-bearing die, according to some embodiments.

FIG. 8 is a high-level logical flowchart of a process for bending a circuit-bearing die, according to some embodiments. Some embodiments include a method for manufacturing an image sensor device.

An adhesive is placed onto a curved substrate in a stage tool (block 8000). Referring, for example, briefly to FIG. 1, in some embodiments, the method includes depositing the adhesive layer 1040 onto the substrate 1050 seated in the stage tool 1070. In some embodiments, the substrate includes a curved surface 1055 and is positioned in the stage tool 1070 to receive the adhesive layer 1040. While the adhesive layer 1040 of FIG. 1 is shown as being equal in area to the area of the curved surface 1055 of the substrate 1050, one of skill in the art will readily comprehend in light of having read the present specification that, in some embodiments, the depositing the adhesive layer 1040 onto a substrate 1050 in the stage tool 1060 further includes depositing the adhesive 1040 onto a surface area smaller than a surface area of the curved surface 1055 of the substrate 1050.

Some embodiments include a non-transitory computer-readable storage medium including program instructions. In some embodiments, the program instructions are executable by one or more processors to cause a manufacturing system to implement depositing an adhesive layer onto a substrate in a stage tool. In some embodiments, the substrate includes a curved surface positioned in the stage tool to receive the adhesive layer.

In some embodiments, the program instructions executable by one or more processors to cause a manufacturing system to implement depositing the adhesive layer onto a substrate in the stage tool further include program instructions executable by one or more processors to cause a manufacturing system to implement depositing the adhesive onto a surface area smaller than a surface area of the curved surface of the substrate.

A die with an image sensor is placed onto the adhesive (block 8010). Referring, for example, briefly to FIG. 1, in some embodiments, the method includes depositing a die 1020 onto the adhesive layer 1040. In some embodiments, the die 1020 contains an image sensor 1030. In some embodiments, the program instructions are executable by one or more processors to cause a manufacturing system to implement depositing a die onto the adhesive layer. In some embodiments, the die contains an image sensor.

Pressure is applied using the bond tool (block 8020). Referring, for example, briefly to FIG. 1, in some embodiments, the method includes applying pressure to the die 1020 using the bond tool 1010. In some embodiments, the applying pressure to the die 1020 further includes applying a pressure calculated to create a curvature of the die 1020 corresponding to a curvature of the curved surface 1055 of the substrate 1050.

In some embodiments, the program instructions executable by one or more processors to cause a manufacturing system to implement applying pressure to the die using a bond tool. In some embodiments, the applying pressure to the die further includes applying a pressure calculated to create a curvature of the die corresponding to a curvature of the curved surface of the substrate. In some embodiments, the program instructions executable by one or more processors to cause a manufacturing system to implement applying pressure to the die further include program instructions executable by one or more processors to cause a manufacturing system to implement applying the pressure using a bond tool having a cavity on a surface of the bond tool for prevention of contact with critical areas of the die.

Energy is applied using the bond tool (block 8030). Referring, for example, briefly to FIG. 1, in some embodiments, the method includes curing the adhesive 1040. In some embodiments, the curing the adhesive 1040 further includes delivering energy to the adhesive 1040 using the bond tool 1010. In some embodiments, the delivering energy to the adhesive 1040 using the bond tool 1010 is performed subsequent to initiation of the applying pressure calculated to create the curvature of the die 1020 corresponding to the curvature of the curved surface 1055 of the substrate 1050.

In some embodiments, the delivering energy to the adhesive 1040 using the bond tool 1010 is performed prior to the applying pressure calculated to create the curvature of the die 1020 corresponding to the curvature of the curved surface 1055 of the substrate 1050. In some embodiments, the delivering energy to the adhesive 1040 using the bond tool 1010 further includes delivering kinetic energy to a pressure-sensitive adhesive 1040 using a strike of the bond tool 1010 against the die 1020.

In some embodiments, the delivering energy to the adhesive 1040 using the bond tool 1010 further includes delivering thermal energy to the adhesive 1040 using a thermal resistor (not shown) located within the bond tool 1010. Alternatively, the bond tool 1010 can receive heat from a heating element external to the bond tool 1010.

In some embodiments, the delivering energy to the adhesive 1040 using the bond tool 1010 further includes delivering light energy to the adhesive 1040 using a light source (not shown) located within or mounted on bond tool 1010.

In some embodiments, the program instructions are executable by one or more processors to cause a manufacturing system to implement curing the adhesive. In some embodiments, the curing the adhesive further includes delivering energy to the adhesive using the bond tool.

In some embodiments, the program instructions executable by one or more processors further include program instructions executable by one or more processors to cause a manufacturing system to implement positioning a substrate in a stage tool. In some embodiments, the program instructions executable by one or more processors to cause a manufacturing system to implement positioning a substrate in the stage tool further include program instructions executable by one or more processors to cause a manufacturing system to implement positioning the substrate with a flat side of a substrate facing a complementary surface of the stage tool and a curved surface of the substrate facing an opening of the stage tool designed for receiving the die and bond tool.

In some embodiments, the delivering energy to the adhesive using the bond tool is performed subsequent to initiation of the applying pressure calculated to create the curvature of the die corresponding to the curvature of the curved surface of the substrate. In some embodiments, the delivering energy to the adhesive using the bond tool is performed prior to the applying pressure calculated to create the curvature of the die corresponding to the curvature of the curved surface of the substrate.

In some embodiments, the delivering energy to the adhesive using the bond tool further includes delivering kinetic energy to a pressure-sensitive adhesive using a strike of the bond tool. In some embodiments, the delivering energy to the adhesive using the bond tool further includes delivering thermal energy to the adhesive using a thermal resistor located within the bond tool. In some embodiments, the delivering energy to the adhesive using the bond tool further includes delivering light energy to the adhesive using a light source.

Figure 9:
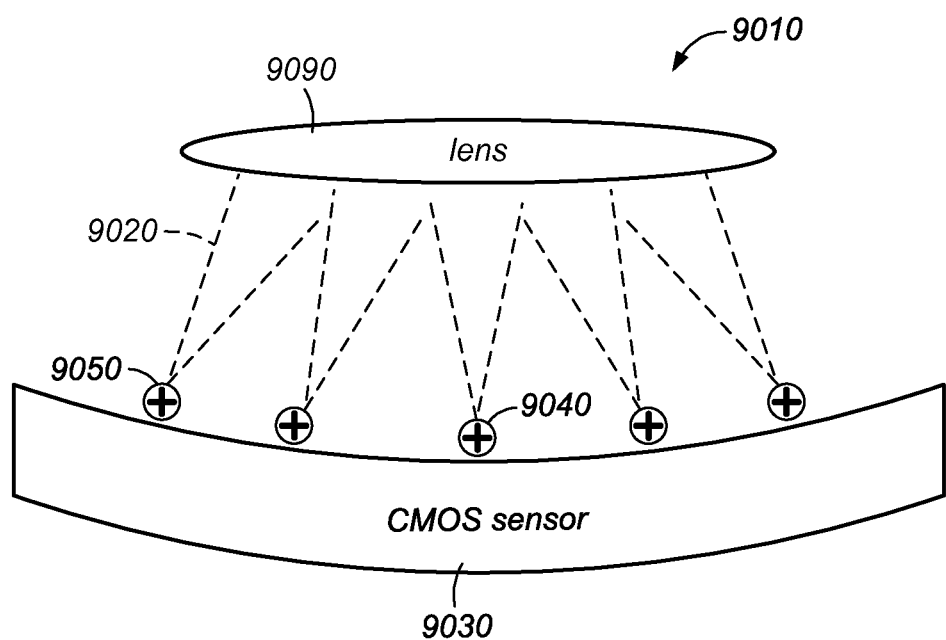
FIG. 9 illustrates a lens of a camera directing light onto an image sensor in a curved die resulting from a process of bending a circuit-bearing die according to some embodiments.

FIG. 9 illustrates a lens of a camera directing light onto an image sensor in a curved die resulting from a process of bending a circuit-bearing die according to some embodiments. In a camera system 9010, light 9020 transits from a lens 9090 to points 9040 and 9050 on an image sensor device 9030.

Multifunction Device

Figure 10:
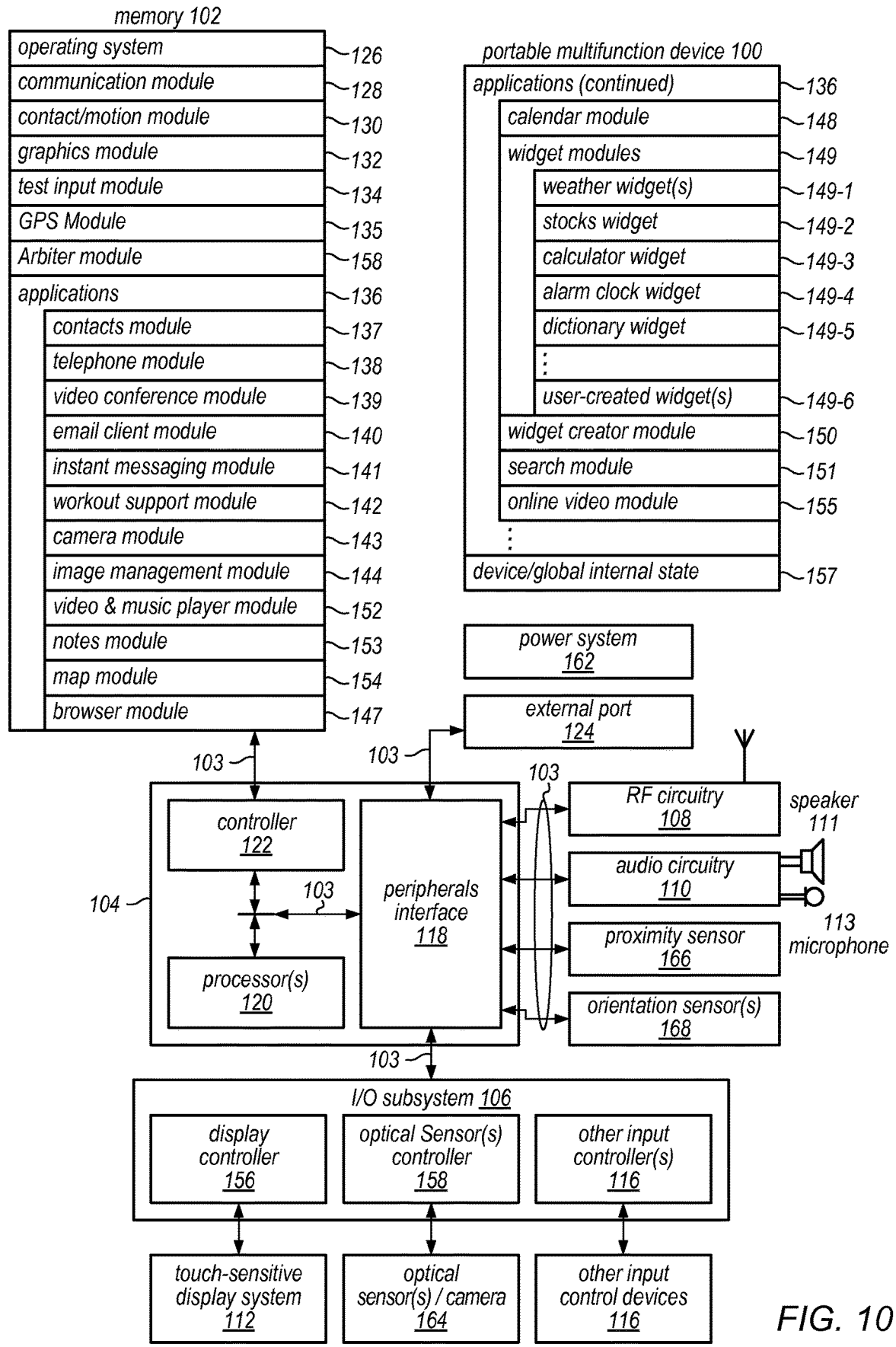
FIG. 10 depicts a block diagram of a portable multifunction device with a camera in accordance with some embodiments.
Figure 11:
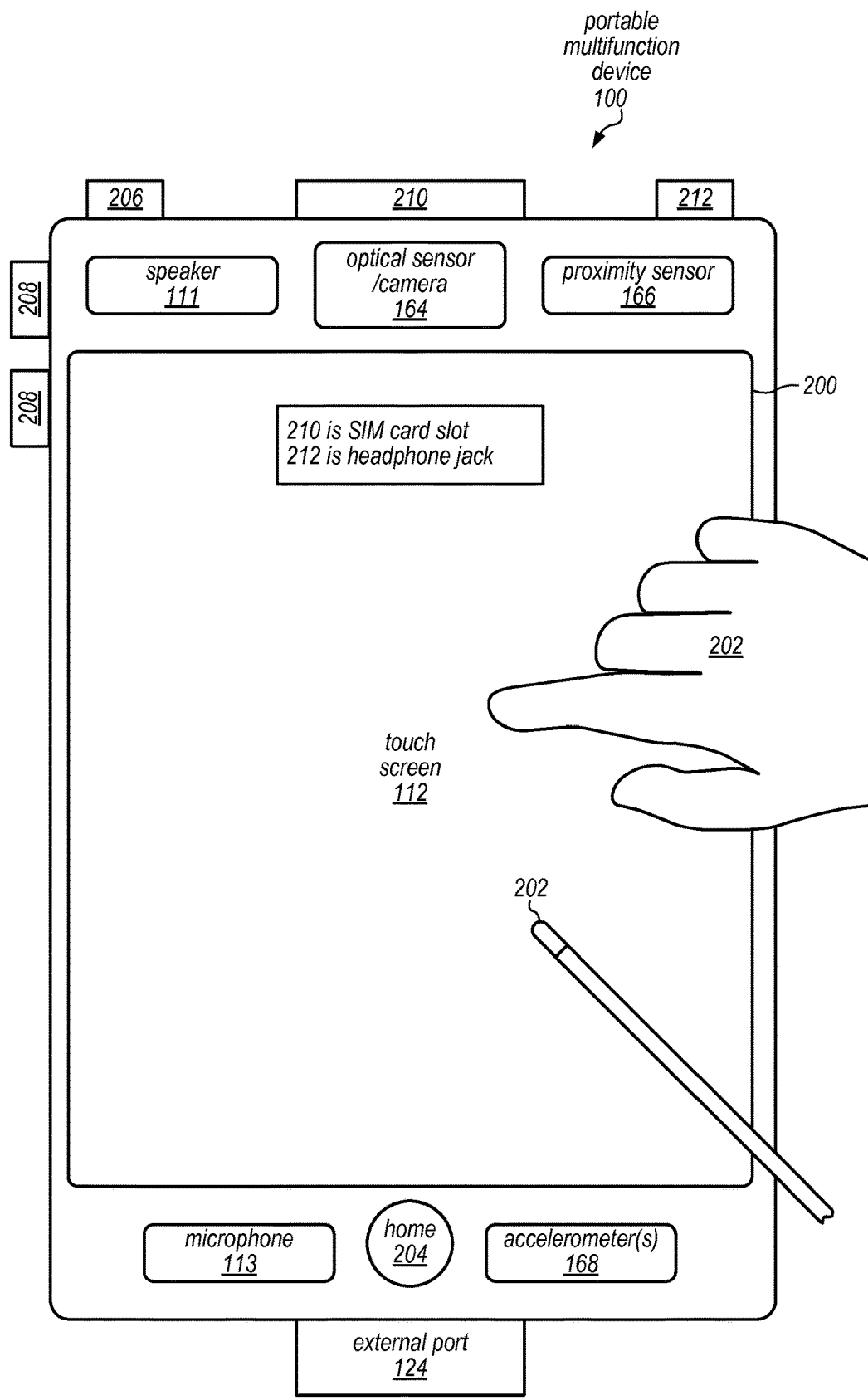
FIG. 11 illustrates a portable multifunction device having a camera in accordance with some embodiments.

FIG. 10 depicts a block diagram of a portable multifunction device with a camera in accordance with some embodiments. Attention is now directed toward embodiments of portable devices with cameras. FIG. 10 is a block diagram illustrating portable multifunction device 100 with camera 164 in accordance with some embodiments. Camera 164 is sometimes called an "optical sensor" for convenience, and may also be known as or called an optical sensor system. Device 100 may include memory 102 (which may include one or more computer readable storage mediums), memory controller 122, one or more processing units (CPU's) 120, peripherals interface 118, RF circuitry 108, audio circuitry 110, speaker 111, touch-sensitive display system 112, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIG. 1A may be implemented in hardware, software, or a combination of hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors or cameras 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, another optical sensor is located on the front of the device so that the user's image may be obtained for videoconferencing while the user views the other video conference participants on the touch screen display.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. In some embodiments, the proximity sensor turns off and disables touch screen 112 when the multifunction device is placed near the user's ear (e.g., when the user is making a phone call).

Device 100 includes one or more orientation sensors 168. In some embodiments, the one or more orientation sensors include one or more accelerometers (e.g., one or more linear accelerometers and/or one or more rotational accelerometers). In some embodiments, the one or more orientation sensors include one or more gyroscopes. In some embodiments, the one or more orientation sensors include one or more magnetometers. In some embodiments, the one or more orientation sensors include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 100. In some embodiments, the one or more orientation sensors include any combination of orientation/rotation sensors. FIG. 1A shows the one or more orientation sensors 168 coupled to peripherals interface 118. Alternately, the one or more orientation sensors 168 may be coupled to an input controller 160 in I/O subsystem 106. In some embodiments, information is displayed on the touch screen display in a portrait view or a landscape view based on an analysis of data received from the one or more orientation sensors.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, arbiter module 157 and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detect contact on a touchpad.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which may be made up of a video player module and a music player module;
- notes module 153;
- map module 154; and/or
- online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a variety of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 1493, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 may include the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making a gesture on the graphics, for example, with one or more fingers 202 (not drawn to scale in the figure) or one or more styluses 203 (not drawn to scale in the figure).

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

It should be noted that, although many of the following examples will be given with reference to optical sensor/camera 164 (on the front of a device), rear-facing camera or optical sensor that is pointed opposite from the display may be used instead of optical sensor/camera 164.

Example Computer System

Figure 12:
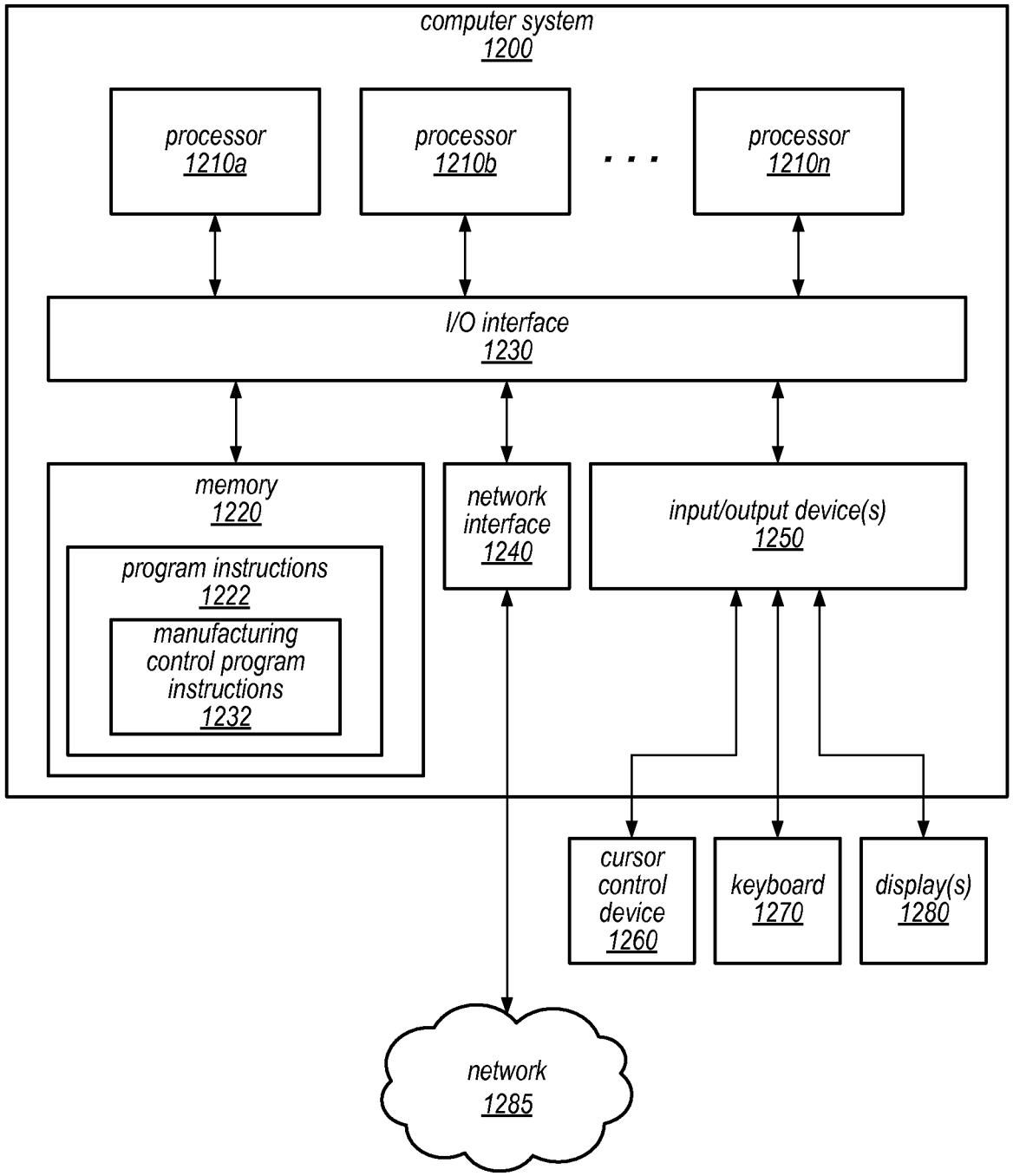
FIG. 12 depicts an example computer system configured to implement aspects of the system and method for bending a circuit-bearing die, according to some embodiments.

FIG. 12 illustrates computer system 1200 that is configured to execute any or all of the embodiments described above. In different embodiments, computer system 1200 may be any of various types of devices, including, but not limited to, a personal computer system, desktop computer, laptop, notebook, tablet, slate, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a manufacturing system and method for bending a circuit-bearing die as described herein, may be executed in one or more computer systems 1200, which may interact with various other devices. Note that any component, action, or functionality described above with respect to FIGS. 1-20 may be implemented on one or more computers configured as computer system 1200 of FIG. 12, according to various embodiments. In the illustrated embodiment, computer system 1200 includes one or more processors 1210 coupled to a system memory 1220 via an input/output (I/O) interface 1230. Computer system 1200 further includes a network interface 1240 coupled to I/O interface 1230, and one or more input/output devices 1250, such as cursor control device 1260, keyboard 1270, and display(s) 1280. In some cases, it is contemplated that embodiments may be implemented using a single instance of computer system 1200, while in other embodiments multiple such systems, or multiple nodes making up computer system 1200, may be configured to host different portions or instances of embodiments. For example, in one embodiment some elements may be implemented via one or more nodes of computer system 1200 that are distinct from those nodes implementing other elements.

In various embodiments, computer system 1200 may be a uniprocessor system including one processor 1210, or a multiprocessor system including several processors 1210 (e.g., two, four, eight, or another suitable number). Processors 1210 may be any suitable processor capable of executing instructions. For example, in various embodiments processors 1210 may be general-purpose or embedded processors implementing any of a variety of instruction set architectures (ISAs), such as the x812, PowerPC, SPARC, or MIPS ISAs, or any other suitable ISA. In multiprocessor systems, each of processors 1210 may commonly, but not necessarily, implement the same ISA.

System memory 1220 may be configured to store manufacturing control program instructions 1232 and/or manufacturing control data accessible by processor 1210. In various embodiments, system memory 1220 may be implemented using any suitable memory technology, such as static random access memory (SRAM), synchronous dynamic RAM (SDRAM), nonvolatile/Flash-type memory, or any other type of memory. In the illustrated embodiment, program instructions 1222 may be configured to implement a lens control application 1224 incorporating any of the functionality described above. Additionally, existing manufacturing control data 1232 of memory 1220 may include any of the information or data structures described above. In some embodiments, program instructions and/or data may be received, sent or stored upon different types of computer-accessible media or on similar media separate from system memory 1220 or computer system 1200. While computer system 1200 is described as implementing the functionality of functional blocks of previous Figures, any of the functionality described herein may be implemented via such a computer system.

In one embodiment, I/O interface 1230 may be configured to coordinate I/O traffic between processor 1210, system memory 1220, and any peripheral devices in the device, including network interface 1240 or other peripheral interfaces, such as input/output devices 1250. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. Also, in some embodiments some or all of the functionality of I/O interface 1230, such as an interface to system memory 1220, may be incorporated directly into processor 1210.

Network interface 1240 may be configured to allow data to be exchanged between computer system 1200 and other devices attached to a network 1285 (e.g., carrier or agent devices) or between nodes of computer system 1200. Network 1285 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1240 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1250 may, in some embodiments, include one or more display terminals, keyboards, keypads, touchpads, scanning devices, voice or optical recognition devices, or any other devices suitable for entering or accessing data by one or more computer systems 1200. Multiple input/output devices 1250 may be present in computer system 1200 or may be distributed on various nodes of computer system 1200. In some embodiments, similar input/output devices may be separate from computer system 1200 and may interact with one or more nodes of computer system 1200 through a wired or wireless connection, such as over network interface 1240.

As shown in FIG. 12, memory 1220 may include program instructions 1222, which may be processor-executable to implement any element or action described above. In one embodiment, the program instructions may implement the methods described above. In other embodiments, different elements and data may be included. Note that data may include any data or information described above.

Those skilled in the art will appreciate that computer system 1200 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1200 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1200 may be transmitted to computer system 1200 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A camera, the camera comprising:
one or more lenses for directing light to an image sensor component of the camera; and
an image sensor device, wherein the image sensor device comprises:
a substrate, wherein the substrate comprises a first side having a curved surface; and
a die attached to the curved surface of the substrate, the die comprising:
a critical area that includes the image sensor component; and
areas on opposing sides of the critical area having sufficient surface area to make contact with ridges of a bond tool to create a curvature of the die and avoid contact between the bond tool and critical areas of the die;
wherein at least a portion of the die comprising the image sensor component has a curved surface.

2. The camera of claim 1, wherein,
the at least a portion of the die comprising the image sensor component having a curved surface further comprises
at least a portion of the die comprising the image sensor component having a curved surface conforming to a focal radius of one of the one or more lenses for directing light to the image sensor component, wherein
the at least a portion of the die comprising the image sensor component having a curved surface includes a curved surface bent after separation of the die from other dice of a wafer to conform to a focal radius of one of the one or more lenses for directing light to the image sensor component.

3. The camera of claim 1, further comprising:
an adhesive layer positioned between the curved surface of the substrate and the die, wherein
the adhesive layer provides a fixed attachment between the die and the substrate.

4. The camera of claim 3, wherein
the adhesive layer comprises a heat-cured adhesive layer for providing a fixed alignment between the die and the one or more lenses.

5. The camera of claim 3, wherein
the adhesive layer comprises a pressure-sensitive adhesive layer for providing a fixed alignment between the die and the one or more lenses.

6. The camera of claim 3, wherein
the adhesive layer comprises a light-cured layer for providing a fixed alignment between the die and the one or more lenses.

7. The camera of claim 3, wherein
a surface area of the adhesive layer is equal to a surface area of the curved surface of the substrate.

8. The camera of claim 3, wherein
a surface area of the adhesive layer is smaller than a surface area of the curved surface of the substrate.

9. The camera of claim 1, wherein,
the substrate further comprises:
a second side having a flat surface for attachment of the substrate to an articulating component for articulating the lens to the image sensor.

10. The camera of claim 1, wherein
the first side having a curved surface further comprises
at least a portion of the substrate having a curved surface conforming to a focal radius of one of the one or more lenses for directing light to the image sensor component.

11. An image sensor device, the image sensor device comprising:
a substrate, wherein the substrate comprises a first side having a curved surface; and
a die attached to the curved surface of the substrate, the die comprising:
a critical area that includes the image sensor component; and
areas on opposing sides of the critical area having sufficient surface area to make contact with ridges of a bond tool to create a curvature of the die and avoid contact between the bond tool and critical areas of the die;
wherein at least a portion of the die comprising the image sensor component has a curved surface, and
an adhesive layer positioned between the curved surface of the substrate and the die, wherein a surface area of the adhesive layer is equal to a surface area of the curved surface of the substrate.

12. The image sensor device of claim 11, wherein,
the at least a portion of the die comprising the image sensor component having a curved surface further comprises
at least a portion of the die comprising the image sensor component having a curved surface conforming to a focal radius of a lens for depositing light on the image sensor component in a camera comprising the image sensor device.

13. The image sensor device of claim 12, wherein
the at least a portion of the die comprising the image sensor component having a curved surface includes a curved surface bent after separation of the die from other dice of a wafer to conform to a focal radius of one of the lens.

14. The image sensor device of claim 11,
wherein the adhesive layer comprises
a heat-cured adhesive layer for providing a fixed alignment between the die and a lens in a camera comprising the image sensor device.

15. The image sensor device of claim 11,
wherein the adhesive layer comprises
a pressure-sensitive adhesive layer for providing a fixed alignment between the die and a lens in a camera comprising the image sensor device.

16. The image sensor device of claim 11,
wherein the adhesive layer comprises
a light-cured adhesive layer for providing a fixed alignment between the die and a lens in a camera comprising the image sensor device.

17. The image sensor device of claim 11, wherein,
the first side having a curved surface further comprises
at least a portion of the substrate having a curved surface conforming to a focal radius of a lens for depositing light on the image sensor component in a camera comprising the image sensor device.

18. The image sensor device of claim 11,
wherein
the adhesive layer provides a fixed attachment between the die and the substrate.

19. The image sensor device of claim 11, wherein the substrate further comprises:
a second side having a flat surface for attachment of the substrate to an articulating component for articulating a lens to the image sensor.

* * * * *